May 13, 1930.  L. S. HARBER  1,758,397
TRAVELING CONVEYER FOR OVENS
Filed May 15, 1926   2 Sheets-Sheet 1
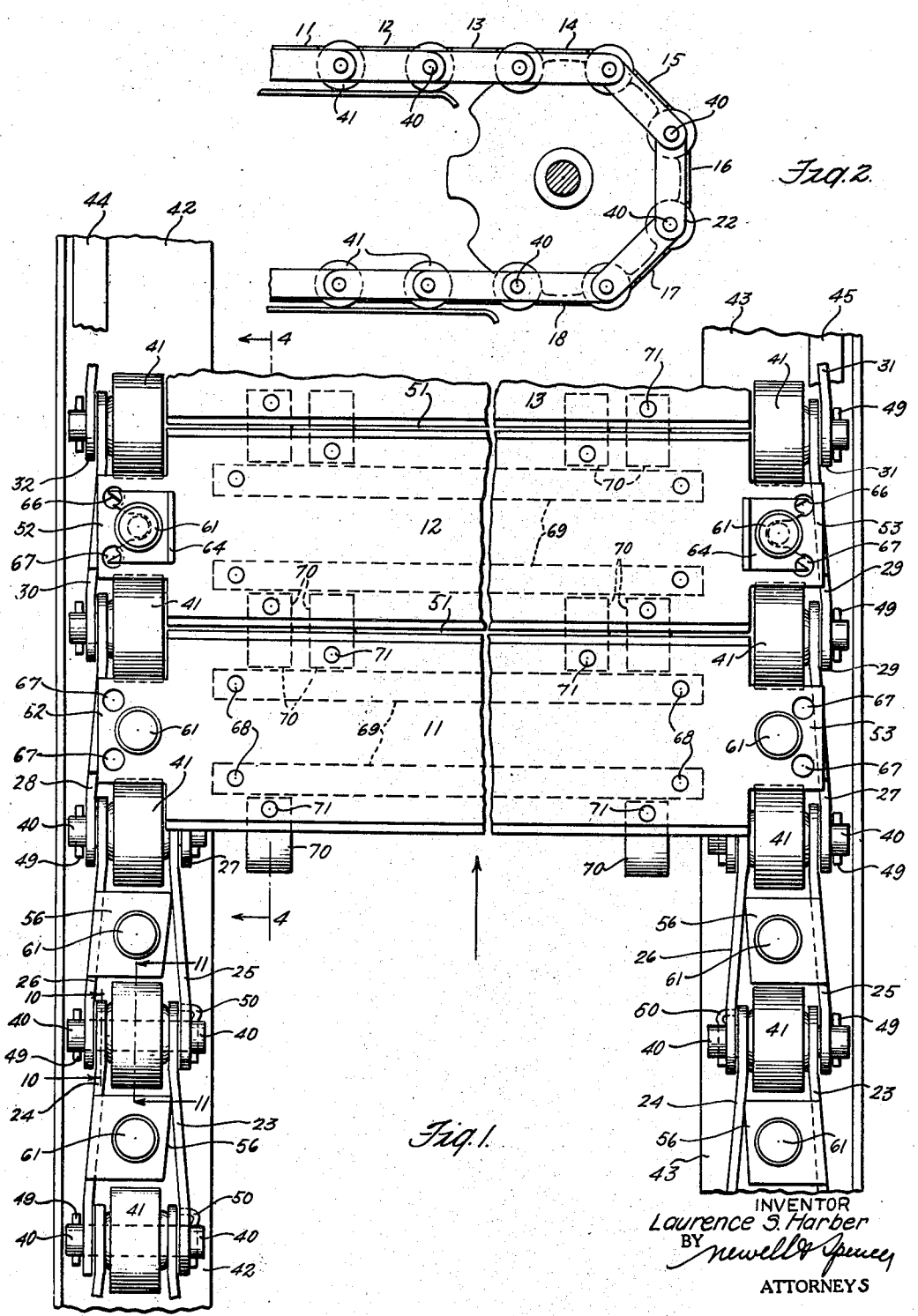
INVENTOR
Laurence S. Harber
BY
ATTORNEYS

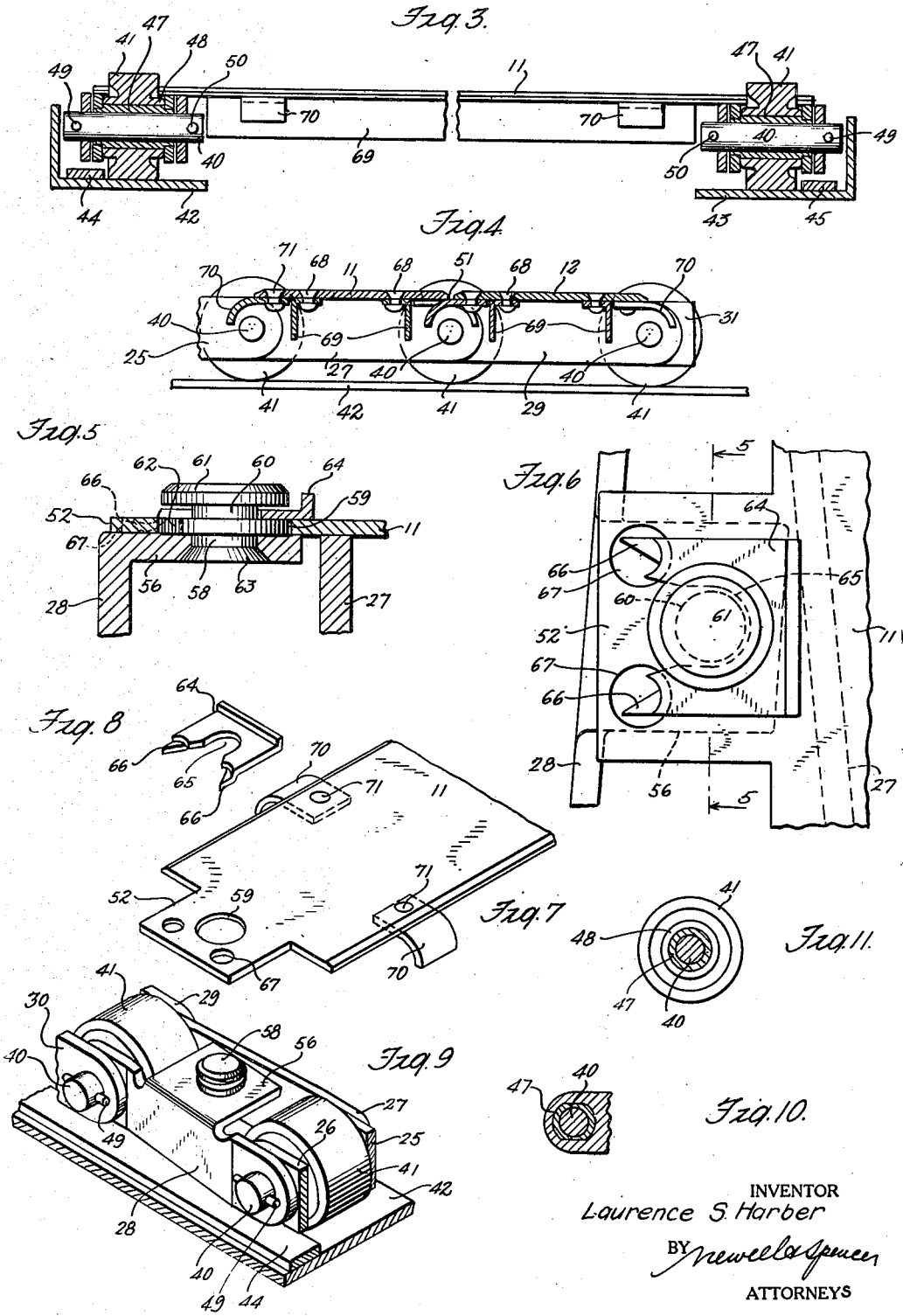

Patented May 13, 1930

1,758,397

UNITED STATES PATENT OFFICE

LAURENCE S. HARBER, OF PETERBOROUGH, ENGLAND, ASSIGNOR TO BAKER PERKINS COMPANY, OF SAGINAW, MICHIGAN, A CORPORATION OF NEW YORK

TRAVELING CONVEYER FOR OVENS

Application filed May 15, 1926. Serial No. 109,258.

This invention relates to conveyers and more particularly to conveyers for use in ovens of the traveling plate or tray type.

The usual conveyer structure comprises a pair of parallel chains to which the carrier plates are rigidly fastened, either to the links or to brackets carried by the links. The power driving the conveyer is usually transmitted by a pulley or gear wheel to a sprocket over which the chains pass. In such a construction no provision has heretofore been made to distribute the driving power evenly between the two chains so that if either chain jams or is retarded in any manner, for example, by the shafts or sprockets being forced out of their proper relative positions, the burden of moving the conveyer is placed solely upon the other chain. As a result, the sprocket and chain moving the conveyer, as well as the plates and the devices fixing the plates to the chains are subjected to a very great strain leading to injury to or destruction of some parts of the mechanism, with constant interruptions in operation. In large bakeries, such interruptions, if frequent, cause large financial losses and are, therefore, undesirable.

In order to insure constant and uniformly smooth operation of the conveyer it is important that the members connecting the chains to each other should be free to move with reference to the chains to an extent which will permit unavoidable differences in the rate of movement of the chains to take place without interrupting or interfering with the operation of the conveyer. It is also important that the chains should not tend to tip sideways during operation.

One of the objects of the invention is to improve the construction of conveyers so as to reduce operating difficulties to a minimum.

In the accomplishment of this object, a feature of the invention is the manner of supporting the carrier plates upon both the inner and outer links of the conveyer chains whereby the links are always maintained in their proper positions with reference to the carrier plates and the tracks upon which the chains move.

In the novel arrangements hereinafter described, connection between the plates and the links is of such a flexible nature that the chains may readily adjust themselves to misalignment of shafts and sprockets, thereby preventing the possibility of destruction of the parts.

A further feature of the invention resides in the increased spacing of the points about which the carrier plates pivot when the chains move unevenly. This construction reduces the angle through which the plates turn when one chain is advanced or retarded and decreases the tendency for the chains to be drawn toward each other and off of the tracks on which they are supported.

The invention comprises in addition to the above-mentioned objects and features, other novel and improved features, constructions and combinations of parts hereinafter described and particularly pointed out in the claims.

Referring to the drawings which represent the preferred form of the invention,

Fig. 1 is a plan view of part of a conveyer embodying the features of the present invention;

Fig. 2 is an end view of a portion of the conveyer, passing over one of the end sprockets;

Fig. 3 is a section along the centre line of a pair of conveyer wheels;

Fig. 4 is a section along line 4—4 of Fig. 1;

Fig. 5 is a section along the line 5—5 of Fig. 6;

Fig. 6 is an enlarged top view showing the flexible connection between a carrier plate and the chains;

Figs. 7, 8 and 9 are perspective views, Fig. 7 showing the end portion of a plate; Fig. 8 the locking device for holding the plate in place and Fig. 9 representing the links and two wheels of the chain to which the plate of Fig. 7 is to be attached;

Fig. 10 is a section along line 10—10 of Fig. 1, and

Fig. 11 is a section along line 11—11 of Fig. 1.

The form of conveyer illustrated in the drawings of this application comprises a series of carrier plates 11, 12, 13, 14, etc., mounted on parallel endless chain structures 21 and 22. The series of carrier plates are secured to the chains 21 and 22, the ends of the plates being attached to the chain structures. The latter comprise a series of inner and outer links 23, 24, 25, 26, etc., positioned in the vertical plane and pivotally connected by means of pins or rods 40 upon which a series of guide rollers or wheels 41 are rotatably mounted.

The wheels 41 are adapted to roll along parallel tracks or rails 42 and 43 which may be arranged in horizontal and inclined flights near the side walls of a baking chamber if desired.

Guides 44 and 45 fixed along the horizontal part of the tracks 42 and 43 respectively maintain the wheels 41 of the parallel chains properly positioned on the tracks. Wheels 41 are rotatably mounted upon antifriction lining members 47 which surround pins or rods 40 as shown in Figure 3. The pairs of links 23 and 24, 25 and 26, etc. are secured to the ends of the pins 40. Wheel 41 as shown in Figure 3 is reinforced on both sides by means of disc-like projections or hubs 48 which are of a smaller diameter than the wheel rim. The anti-friction lining 47 projects beyond the hubs 48 on each side sufficiently far to provide a rotatable mounting for links 23 and 24 but not to include links 25 and 26 which are arranged to turn directly on the rod 40. A cotter pin 49 holds the links and wheel on the rod at its outer side while at its inner side there is provided a hooked pin 50 whose end is inserted into an opening in the side of link 25, thereby preventing the rotation of rod 40.

It will be noticed that the links all extend upwardly an equal distance from the center of the rod 40 preferably lower than the wheel 41, but higher than the hubs 48. The links in extending from one rod to the next succeeding one, converge in the direction of the arrow, as shown in Fig. 1, so that the links 25 and 26, which are adjacent the forward wheel 41, are spaced from the rear wheel by the links 23 and 24. Both chains 21 and 22 comprised of wheels, the rods on which they rotate and the links connecting the rods, are constructed in exactly the same manner. The carrier plates are all of the same width which is slightly less than the distance between the successive rods which secure the links of the chain together. The small spaces 51 between adjacent plates are located directly over the axes of the corresponding rods as shown in Figure 1 in the cases of plates 11 and 12 and 12 and 13.

In order to maintain the plates in this position on the conveyer, they are provided at their ends with flat projections whose surfaces are level with that of the plates, the projections being of such length that they may rest on the top of the outer links and of such width that they do not touch or interfere with the wheels between which they pass. Thus, plates 11 and 12 have, at their left, as shown in Figure 1 the projections 52 and at their right projections 53.

The outer chain links are provided with brackets 56 integral therewith, and which are shown extending inwardly from the outer links between the wheels to which the links are connected without touching or interfering with them. Said brackets have their top surfaces so arranged that they are level with the tops of the corresponding inner links. These brackets 56 and the projections 52 of the carrier plates are flexibly connected in the following manner:

Studs 58 fixed, and preferably riveted, to the tops of the brackets 56 of the outer links, comprise a stem 60, a top disc 61 and a lower disc 62, which is formed by the reinforced top part of the rivet 63. The discs 61 and 62 are parallel to each other and are of a diameter somewhat smaller than an opening 59 provided in the plate projection 52 to receive the stud 58. The studs 58 are slipped through the openings 59 so that the projections of the carrier plates rest on top of the brackets of the outer links. This position may be maintained by any suitable means and adapted to allow a slight up and down movement of the carrier plates. The studs 58 are preferably positioned vertically and midway between the inner and outer links of the chains. The vertical forces applied to the plates are thus transferred to both inner and outer links of the chains so that the tendency for the chains to tip sidewise is reduced.

When the plate 11, for example, has been placed so that the opening 59 of its projection 52 registers with the stud 58, the discs 61 and 62 of the latter project through the opening. The plate 11 is retained in this position by means of a washer 64 provided with a slot 65 and pointed side parts 66, the slot 65 being as wide as the stem 60 of the stud. This washer is pushed between the projection 52 and the upper disc 61 and the tips of the pointed side parts 66 of the washer are bent downwardly into two corresponding openings 67 in the projection 52. The latter is thus loosely but safely held on the lower disc 62 around which it freely turns. This arrangement allows the carrier plates to turn sidewise and to move up and down to a slight degree, giving to the connection just the flexibility necessary to overcome the unevenness of the tracks, sprockets and like guides on which the conveyer travels without unduly shaking or otherwise disturbing the goods on the plates. Disturbance of or damage to the conveyer caused by mis-alignment of its shafts and sprockets is also thereby prevented.

In Figure 4, the manner of loosely supporting the carrier plates upon the inner links of the chains is clearly shown. The ends of the main portions of plates 11 and 12 adjacent to the inner faces of the wheel 41 rest upon the oblong parts of links 27 and 29 respectively. The middle part of plate 12 rests upon the middle part of link 29 and the middle part of plate 11 rests upon the middle part of link 27. The edges of plate 11 extend beyond the ends of link 27 onto the oblong part of links 25 and 29. In a similar way the edges of plate 12 extend over onto adjacent links 27 and 31. In order to strengthen the carrier plates which are usually very long, angles 69 are preferably fixed to the undersides of the plates by means of rivets 68, as shown in Figures 1, 3 and 4. The angle irons may extend nearly the whole width of the plates.

Adjacent carrier plates are prevented from rising above or dropping below each other by the provision of a number of brackets 70 whose parts are fixed by means of rivets 71 to the underside of the plates, the curved parts of the brackets projecting downward beyond the sides of the plates in opposite directions. The curved part of these brackets preferably forms an arc of a circle. When the plates are traveling horizontally, as shown in Fig. 1, the curved parts of the brackets of the plates project completely underneath the adjacent plates. Thus, in Fig. 1, brackets 70 of plate 11, extend beneath plate 12, and brackets 70 of plate 12 extend beneath plate 11, while the brackets of plate 12 extend beneath the plate 13, and the brackets of plate 13 extend beneath plate 12. These curved brackets arranged in the manner shown thus effectually prevent adjacent plates from rising above or dropping below each other.

It is understood that the invention is not limited to the particular construction and arrangement of parts of the illustrated embodiment of the invention, but that the invention may be embodied in other forms within the scope of the claims.

What is claimed as new is—

1. In a conveyer mechanism, a pair of double link chains having inner and outer links, carrier plates supported at both ends upon said double links and flexible means to attach said plates solely to the outer links of said chains, said flexible means comprising a bracket on said outer link, extending inwardly toward the inner link, a stud on said bracket, an extension on said plate having an aperture therein adapted to receive said stud, and a slotted washer loosely secured to said plate extension and embracing said stud.

2. In a conveyer for traveling ovens, the combination of a pair of chains, each chain comprising separate inner and outer links pivotally connected with the preceding and succeeding links of the chain, and carrier plates supported at their ends one on each pair of links of said chains and positioned thereon by pivots secured to the chains at points spaced outwardly from the inner links of the chains.

3. In a conveyer for traveling ovens, the combination of a pair of tracks, a pair of chains each of which comprises separate inner and outer links, rotatable members carried by said chains and running on said tracks, and carrier plates supported on said chains and loosely secured thereto at points spaced outwardly from the inner links of the chains.

4. A conveyer comprising in combination a pair of tracks, a pair of chains each of which comprises inner and outer links, rotatable members carried by said chains, said members being positioned between said inner and outer links and running on said tracks, and carrier plates supported upon both the inner and outer links of said chains and loosely secured thereto at points spaced outwardly from the inner links of the chains and in longitudinal alinement with said rotatable members.

5. A conveyer comprising a pair of chains, each of which comprises separate inner and outer links, rotatable members carried by said chains, carrier plates supported on said chains, each of said plates being formed with projections on its ends which extend between said rotatable members and rest upon the outer links of said chains in the upper run of the conveyer, and means for securing said plates to said chain adapted to permit movement relative to said chains about an axis perpendicular to said plates from a point within the space between each inner and outer link.

6. A conveyer comprising a pair of chains, each of which comprises separate inner and outer links, said outer links being formed with supporting surfaces respectively lying in the same plane with the corresponding surfaces of the inner links of the chains, rotatable members carried by said chains, carrier plates supported on said chains and resting upon the inner links of the chains in the upper run of the conveyer, each of said plates being formed with projections on its ends which extend between said rotatable members and rest upon the supporting surfaces of said outer links, and means loosely securing said plates to said chains at points spaced outwardly from the inner links of the chains.

7. A conveyer comprising a pair of chains each of which is formed with separate inner and outer links, a pair of tracks, rotatable members carried by said chains, said rotatable members being positioned between said inner and outer links and running on said tracks, carrier plates supported on said chains and having portions thereof resting upon the upper faces of said inner and outer links of the chains, in the upper run of the conveyer, and means for securing said plates to said chains at points located between said inner and outer links of said chains.

8. A conveyer comprising a pair of chains each of which is formed with separate inner and outer links, a pair of tracks, rotatable members carried by said chains, said rotatable members being positioned between said inner and outer links and running on said tracks, carrier plates supported on said chains and having portions thereof resting upon the upper faces of said inner and outer links of the chains in the upper run of the conveyer, said plates being shaped adjacent the points of support and mounted thereon in a manner adapted to permit movement about a pivot perpendicular to the plate.

9. In a conveyer for traveling ovens, the combination of a pair of chains each chain comprising separate inner and outer links pivotally connected with preceding and succeeding links of the chain and carrier plates supported on said chains and pivotally secured to the outer links and loosely supported on the inner links.

LAURENCE S. HARBER.